United States Patent
Streichert et al.

(10) Patent No.: US 10,013,658 B2
(45) Date of Patent: Jul. 3, 2018

(54) CONTROL DEVICE AND METHOD FOR CALCULATING AN OUTPUT PARAMETER FOR A CONTROLLER

(75) Inventors: Felix Streichert, Yokohama (JP); Tobias Lang, Kirchberg (DE); Heiner Markert, Stuttgart (DE); Axel Aue, Korntal-Muenchingen (DE); Thomas Kruse, Stuttgart (DE); Volker Imhof, Kornwestheim (DE); Thomas Richardsen, Gerlingen (DE); Ulrich Schulmeister, Beitigheim-Bissingen (DE); Nico Bannow, Stuttgart (DE); Rene Diener, Ludwigsburg (DE); Ernst Kloppenburg, Ditzingen (DE); Michael Saetzler, Stuttgart (DE); Holger Ulmer, Ulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1151 days.

(21) Appl. No.: 13/643,464

(22) PCT Filed: Apr. 6, 2011

(86) PCT No.: PCT/EP2011/055312
§ 371 (c)(1),
(2), (4) Date: Jan. 8, 2013

(87) PCT Pub. No.: WO2011/134764
PCT Pub. Date: Nov. 3, 2011

(65) Prior Publication Data
US 2013/0110749 A1    May 2, 2013

Related U.S. Application Data

(63) Continuation-in-part of application No. 12/384,874, filed on Apr. 9, 2009, now Pat. No. 8,155,857.

(30) Foreign Application Priority Data

Apr. 27, 2010 (DE) ............. 10 2010 028 266

(51) Int. Cl.
*G06N 99/00* (2010.01)
*F02D 41/14* (2006.01)
(Continued)

(52) U.S. Cl.
CPC ....... *G06N 99/005* (2013.01); *F02D 41/1401* (2013.01); *G05B 17/02* (2013.01); *G06N 7/005* (2013.01); *F02D 2041/1433* (2013.01)

(58) Field of Classification Search
None
See application file for complete search history.

(56) References Cited

U.S. PATENT DOCUMENTS 5,442,569 A    8/1995    Osano
6,076,030 A *  6/2000    Rowe .................... 701/50
(Continued)

FOREIGN PATENT DOCUMENTS

CN    101725423    6/2010
DE    199 63 213    7/2001
(Continued)

OTHER PUBLICATIONS

Kocijan, Juš, et al. "Gaussian process model based predictive control." American Control Conference, 2004. Proceedings of the 2004. vol. 3. IEEE, 2004.*
(Continued)

*Primary Examiner* — Kakali Chaki
*Assistant Examiner* — Daniel Pellett
(74) *Attorney, Agent, or Firm* — Norton Rose Fulbright US LLP; Gerard Messina (57) ABSTRACT

A control device in a vehicle includes a unit for calculating, during operation of the vehicle, on the basis of at least one
(Continued)

input variable ascertained during operation, at least one output variable for a control system of functions of the vehicle. The control device performs the calculation of the output variables using a Bayesian regression of training values ascertained, before operation, for the output variable and the input variable.

20 Claims, 3 Drawing Sheets

(51) Int. Cl.
    *G05B 17/02*     (2006.01)
    *G06N 7/00*     (2006.01)

(56) References Cited

U.S. PATENT DOCUMENTS

| | | | |
|---|---|---|---|
| 6,223,194 | B1 | 4/2001 | Koike |
| 7,457,785 | B1* | 11/2008 | Greitzer ............... G01D 1/18 706/12 |
| 2008/0162386 | A1* | 7/2008 | Rifkin et al. ................. 706/12 |
| 2009/0259385 | A1* | 10/2009 | Loeffler et al. ............ 701/102 |
| 2010/0286899 | A1* | 11/2010 | Jain et al. .................. 701/119 |
| 2011/0257949 | A1* | 10/2011 | Vasudevan et al. ............ 703/2 |
| 2011/0264353 | A1* | 10/2011 | Atkinson et al. ........... 701/102 |

FOREIGN PATENT DOCUMENTS

| | | |
|---|---|---|
| DE | 11 2005 003527 | 4/2008 |
| DE | 10 2007 008 514 | 9/2008 |
| DE | 10 2008 004 362 | 7/2009 |
| DE | 10 2008 001081 | 10/2009 |
| DE | 10 2008 043315 | 5/2010 |
| JP | 8-508838 | 9/1996 |
| JP | 08508838 | 9/1996 |
| JP | 11-7306 | 1/1999 |
| JP | 11-315556 | 11/1999 |
| JP | 11315556 | 11/1999 |
| JP | 11-007306 | 12/1999 |
| JP | 2006-47000 | 2/2006 |
| JP | 2006047000 | 2/2006 |
| JP | 2006047700 A | 2/2006 |
| JP | 2007-069198 | 3/2007 |
| JP | 2009-250243 | 10/2009 |
| JP | 2009250243 | 10/2009 |
| WO | WO 95/00915 | 1/1995 |
| WO | WO 95/00915 | 5/1995 |

OTHER PUBLICATIONS

Hu, Huosheng, and Michael Brady. "A Bayesian approach to real-time obstacle avoidance for a mobile robot." Autonomous Robots 1.1 (1994): 69-92.*
Li, Xiangyang, and Qiang Ji. "Active affective state detection and user assistance with dynamic Bayesian networks." Systems, Man and Cybernetics, Part A: Systems and Humans, IEEE Transactions on 35.1 (2005): 93-105.*
Han, Jiarui, Tze Leung Lai, and Viktor Spivakovsky. "Approximate policy optimization and adaptive control in regression models." Computational Economics 27.4 (2006): 433-452.*
Ward, M. C., et al. "Bayesian statistics in engine mapping." Statistics and analytical methods in automotive engineering: IMechE conference transactions. 2002.*
Möbus, Claus, and Mark Eilers. "Further steps towards driver modeling according to the Bayesian programming approach." Digital Human Modeling. Springer Berlin Heidelberg, 2009. 413-422.*
Rasmussen, Carl Edward. "Gaussian processes for machine learning." (2006).*
Möbus, Claus, et al. "Mixture of Behaviors in a Bayesian Autonomous Driver Model."*
Demeester, Eric, et al. "User-adapted plan recognition and user-adapted shared control: A Bayesian approach to semi-autonomous wheelchair driving." Autonomous Robots 24.2 (2008): 193-211.*
Gramacy, Robert B. Bayesian treed Gaussian process models. Diss. University of California Santa Cruz, 2005.*
Hall, David L., and James Llinas. "An introduction to multisensor data fusion." Proceedings of the IEEE 85.1 (1997): 6-23.*
Greitzer, Frank L., and Thomas A. Ferryman. "Predicting remaining life of mechanical systems." Intelligent Ship Symposium IV. 2001.*
"Validation of Neural Networks in Automotive Engine Calibration," D. Lowe and K. Zapart, Proceedings Conference on Artificial Neural Networks, 1997.
"Gaussian Process Model Based Predictive Control", J. Kocian, et al., Proceedings of the 2004 American Control Conference, Boston, MA, Jun. 30, 2004; pp. 2214-2219.
Support'Vector Networks, C. Cortes and V. Vapnik, Machine Learning, 20, 1995.
A statistical approach to some mine valuations and allied problems at the Witwatersrand, D. G. Krige, 1951.
The intrinsic random functions, and their applications, G. Matheron, Adv. Appl. Prob., 5, pp. 439-468, 1973.
Evaluation of Gaussian Processes and other Methods for Non-Linear Regression, C. E. Rasmussen, 1996.
Sparse Gaussian processes using pseudo-inputs. E. Snelson and Z. Ghahramani, Advances in Neural Information Processing Systems 18, pp. 1259-1266, 2006.
Fast Gaussian process regression using KD-trees, Y. Shen, A. Ng, and M. Seeger, in Advances in Neural Information Processing Systems 18, pp. 1227-1234, 2006.
Multiple-step ahead prediction for non linear dynamic Systems—A Gaussian process treatment with propagation of the uncertainty, A. Girard, C. E. Rasmussen, and R. Murray-Smith, in Advances in Neural Information Processing Systems 15, Cambridge, 2003.
Comprising Prior Knowledge in Dynamic Gaussian Process Models, K. Azman and J. Kocijan, International Conference on Computer Systems and Technologies—CompSysTech 2005.
Gaussian process approach for modeling of nonlinear systems, G. Gregorcic, G. Lightbody, in Engineering Applications of Artificial Intelligence 22, pp. 522-533, 2009.
International Search Report for PCT/EP2011/05531, dated Jul. 15, 2011.
"Bayesian statistics in engine mapping," Ward, M. C., Brace, C. J., Vaughan, N. D., Shaddick, G., Ceen, R., Hale, T., Kennedy, G. in International Conference on Statistics and Analytical Methods in Automotive Engineering, IMechE Conference Transactions, pp. 3-15, 2002.*.
Wilhelmsson, Carl: "Field Programmable Gate Arrays and Reconfigutable Computing in Automatic Control", Lund University (2007), pp. 1-88.

\* cited by examiner

CONTROL DEVICE AND METHOD FOR CALCULATING AN OUTPUT PARAMETER FOR A CONTROLLER

CROSS-REFERENCE TO RELATED APPLICATIONS

The present application is a continuation-in-part of U.S. patent application Ser. No. 12/384,874, which was filed Apr. 8, 2009, issued on Apr. 10, 2012 as U.S. Pat. No. 8,155,857, and claims priority under 35 U.S.C. § 119 to DE 10 2008 001 081.2, filed in the Federal Republic of Germany on Apr. 9, 2008.

BACKGROUND OF THE INVENTION

1. Field of the Invention

The present invention relates to a control device in a vehicle and a method for calculating an output variable for a control system of functions of the vehicle.

2. Description of the Related Art

A variety of methods can be used in order to determine variables in vehicle control devices that cannot be measured or can be measured only with great difficulty (and thus too expensively for implementation in production vehicles), for example critical variables of the combustion process in an engine control device such as exhaust gas temperature, fill state, raw emissions values, efficiencies, consumption, etc., but that are needed by the control device in order to perform its control functions. One widely used method is that of characteristic curves, which can represent a one-dimensional correlation; or that of characteristics diagrams, which can represent a two- or multi-dimensional correlation. These characteristics diagrams can be defined/stored via interpolation points, and a prediction of the target variable for specific input values can be interpolated from the adjacent interpolation points, e.g. linearly or using splines (see, for example, published German patent application document DE 199 63 213 A1). Other methods are based on, as a rule, highly simplified physical models (see, for example, published German patent application document DE 10 2008 004 362 A1), which are often also represented by characteristics diagrams. Consideration is also given to data-based parametric regression models such as, for example, neural networks (e.g. published German patent application document DE 10 2007 008 514).

In the automotive sector, so-called Bayesian regressions are used not "online" (i.e. during normal operation of the vehicle), but instead "offline," for example in a calibration phase of an engine; see, for example, "Bayesian statistics in engine mapping," Ward, M. C., Brace, C. J., Vaughan, N. D., Shaddick, G., Ceen, R., Hale, T., Kennedy, G. in International Conference on Statistics and Analytical Methods in Automotive Engineering, IMechE Conference Transactions, pp. 3-15, 2002; and "Validation of Neural Networks in Automotive Engine Calibration," D. Lowe and K. Zapart, Proceedings Conference on Artificial Neural Networks, 1997.

When characteristics diagrams are used to characterize the correlations, there is often a high degree of application complexity or low prognosis accuracy for multi-dimensional correlations. Creation of a reliable physical model results in a large development outlay, and it is not always possible to develop a physical model that is not too highly simplified, in particular given the complex events of the combustion process, which must embrace not only thermodynamics but also, for example, chemistry and flow mechanics. For the known methods, it is the case that they make no statements as to the expected accuracy. This can be important, however, in particular for critical target variables, in order to ensure a reliable open- or closed-loop control strategy.

BRIEF SUMMARY OF THE INVENTION

Bayesian regression is intended to be used for the determination of variables in vehicle control devices that cannot be measured or can be measured only with great difficulty (and thus too expensively for implementation in production vehicles), for example critical variables of the combustion process in an engine control device such as exhaust gas temperature, fill state, raw emissions values, efficiencies, consumption, etc., but that are needed by the control device in order to perform its control functions. The method proposed here, using nonparametric data-based Bayesian regression, is real-time-capable and, especially in the case of multidimensional and/or particularly complex problems, supplies more reliable predictions that the known methods such as, for example, characteristics diagram interpolation or simplified physical models, and can moreover also be carried out with greater memory efficiency. In addition, the necessary prior knowledge or, associated therewith, the required advance outlay for correctly defining the input/output correlation using characteristics diagrams and/or a physical model, or for defining algorithm parameters in the case of parametric data-based regression methods such as neural networks, e.g. the number of neurons required, is considerably less with the proposed method and control device.

It is particularly advantageous to implement the Bayesian regression as Gaussian processes, in particular sparse Gaussian processes, which can make possible particularly memory- and computation-efficient calculation.

For open- or closed-loop control on the basis of output variables determined by Bayesian regression, it is particularly useful to take into account not only the output variable but also the variance ascertainable from the Bayesian regression. More reliable and more accurate open- and closed-loop control can thereby be achieved. In particular, with a high variance that, for example, exceeds a specific threshold value, i.e. in the context of a possibly high inaccuracy for the output variable, a defensive open- or closed-loop control strategy can be selected, a fault signal can be outputted, or other suitable actions can be taken.

Specific closed- and open-loop control tasks can be carried out, particularly advantageously, if older input variables and/or older output variables are also incorporated into the regression, in addition to the current input variables, in order to determine the current output variable. The result is that even more-complex dynamic, i.e. not quasi-steady-state, processes can be mapped, and can be regulated or controlled with greater accuracy. The term used in this case is "dynamic modeling by autoregression."

In order to avoid excessive loads on the computation capacity and capabilities of a computation unit of the control device, individual sub-tasks of the regression calculation can be offloaded to hardware units specializing therein. Because of their specialization, these hardware units are capable of carrying out those tasks more quickly and more efficiently than the more flexible computation units. For the Bayesian regression that is to be carried out, it is particularly advantageous in this context if only exponential function calculations that require complex calculation are offloaded, by calculation units (such as microcontrollers) usually used in the control device, at least partly from the calculation unit to the hardware unit, in particular to a logic circuit.

DETAILED DESCRIPTION OF THE INVENTION

So-called nonparametric regression methods have been developed and refined in recent years, in particular kernel-based methods such as support-vector machines [Support-Vector Networks, C. Cortes and V. Vapnik, Machine Learning, 20, 1995] and, as a further subclass, the so-called Bayesian regression methods such as, for example, kriging [A statistical approach to some mine valuations and allied problems at the Witwatersrand, D. G. Krige, 1951; The intrinsic random functions, and their applications, G. Matheron, Adv. Appl. Prob., 5, pp 439-468, 1973], Gaussian processes [Evaluation of Gaussian Processes and other Methods for Non-Linear Regression, C. E. Rasmussen, 1996], sparse Gaussian processes [Sparse Gaussian processes using pseudo-inputs. E. Snelson and Z. Ghahramani, Advances in Neural Information Processing Systems 18, pp 1259-1266, 2006], and others.

Parametric models require an a priori postulate of the relationship between the input variables and the output variables that are to be modeled. Such methods include, for example, physical modeling, linear or polynomial regression, or also neural networks. The goal here is to determine optimum parameters on the basis of the postulate so that the postulated model comes as close as possible to the function being modeled. An incorrect or insufficient postulate thus also causes the model to fail. Nonparametric modeling, on the other, hand, such as Bayesian regression methods, requires no such postulate. Instead of the model being limited to one specific postulate, all or very many hypotheses can also be considered.

Bayesian regression is a data-based method, i.e. training points as well as associated output values are needed in order to create a model. From these, models are then created; this is essentially tantamount to storing the training data and determining abstract "hyperparameters" that parameterize the space of the random functions and effectively weight the influence of the individual training points on the later model prediction. The kernel function K discussed below, which is the basis for generating the random function (the Gaussian process), is the so-called quadratic exponential function.

The fundamentals of Bayesian regression may be found in "Gaussian Processes for Machine Learning," C. E. Rasmussen and C. Williams, MIT Press, 2006. The basic formula for calculating the prediction v at point u is:

$$v = \sum_{i=1}^{N} (Q_y)_i \sigma_f \exp\left(-\frac{1}{2}\sum_{d=1}^{D}\frac{((x_i)_d - u_d)^2}{l_d}\right)$$

where v denotes the prediction of the output variable, x denotes training data, u the test point (input variable), σ and l are exemplifying hyperparameters, and Q denotes a vector from model training. The summations run over D dimensions of the input data or training data, and over N training data. The input variable u can be incorporated into the calculation in normalized form.

The formula for calculating the model variance σ_v for the output variable is:

$$(k_u)_i = \sigma_f \exp\left(-\frac{1}{2}\sum_{d=1}^{D}\frac{((x_i)_d - u_d)^2}{l_d}\right)$$

$$\sigma_v = \sigma_f - \sum_{i=1}^{N}\sum_{j=1}^{N}(k_u)_i Q_{ij} (k_u)_j - \sigma_n^2$$

Possible implementations of Bayesian regression exist in the case of kriging, by reducing the so-called hyperparameters. Other Bayesian regression methods could alternatively also introduce additional hyperparameters or work with other kernel functions, which could also do without exponential functions. In the case of sparse GP, virtual training points ($x_i$) are introduced, which can be distributed in problem-specific fashion over the input space and can thus reduce the number N of training points required. Alternative approaches, such as KD trees, use limit values for the internal distances (internal sum over D), and efficient memory structures, in order to allow summary estimation of the influence of groups of lower-relevance training points. The result is to further reduce the number of terms (external sum over N) that need to be calculated.

In particular, the formulas recited above can be reduced to a simpler form:

$$\hat{v} = \sum_{i=1}^{N}(Q_{yA})_i \exp\left(\sum_{d=1}^{D}(\hat{x}_i)_d \hat{u}_d - \sum_{d=1}^{D}\hat{u}_d^2\right)$$

The sparse Gaussian process is particularly suitable, since it allows larger data volumes to be processed and increases the prediction speed, since the number of virtual training points is typically smaller than the number of original data.

There are numerous possibilities for expanding the algorithms, allowing the methods to be used with large data volumes, for example, so that (depending on the accuracy requirement) either a fast but less accurate result is returned, or else a more accurate result that nevertheless is more complex to calculate; in other words, it is possible to adapt the accuracy of the model prediction to the available computation time. [E. Snelson and Z. Ghahramani, Advances in Neural Information Processing Systems 18, pp 1259-1266, 2006] [Fast Gaussian process regression using KD-trees, Y. Shen, A. Ng, and M. Seeger, in Advances in Neural Information Processing Systems 18, pages 1227-1234, 2006]

Bayesian regression methods such as, for example, kriging, Gaussian processes, sparse Gaussian processes, etc. are now to be used on the control device of a vehicle for predicting engine-relevant parameters (e.g. combustion-engineering variables, air system variables, etc.) for open- and/or closed-loop control purposes.

Figure 1:
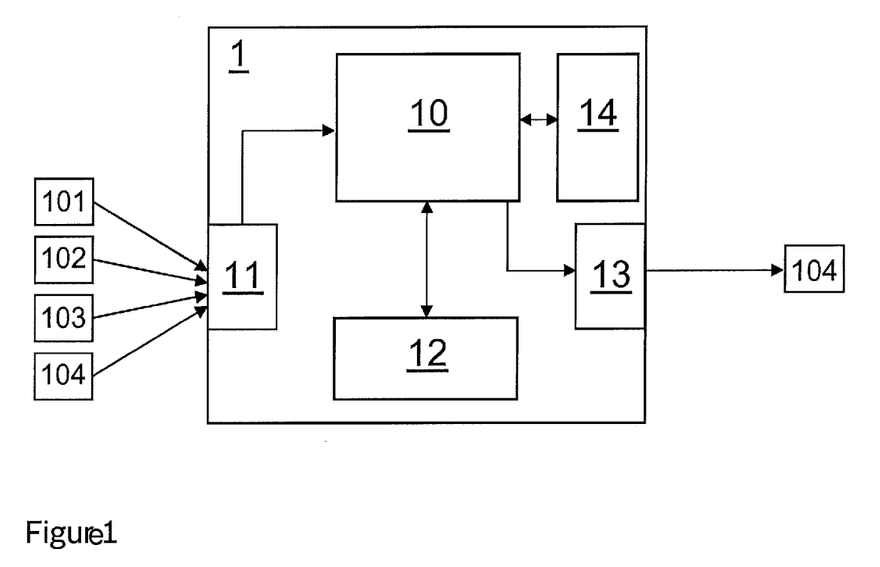
FIG. 1 schematically shows a control device as well as units external to the control device.

FIG. 1 schematically shows a control device in a vehicle. Control device 1 possesses a computation unit 10, a memory 12, an input 11, an output 13, and a logic circuit 14. Through input 11, the control device receives signals from outside the control device, for example from sensors or other control devices, computation units, or other modules 101 to 104. These variables are referred to here and hereinafter as "input variables," and can represent, for example, temperature signals, rotation speed signals, quantity signals, etc. Memory unit 12 stores values that were determined for specific variables in test measurements offline, i.e. before the operation of control device 1 or of the vehicle, and were stored in memory unit 12. These values are referred to here and hereinafter as "training values." The terms "offline" or "before operation" determine a phase in which control device 1 is not being used, during normal operation of the vehicle, for real-time closed- and open-loop control tasks ("online," "during operation"), but in which vehicle functions relevant to the control device are tested, calibrated, and determined, for example in an application of the control device an automotive supplier's or automobile manufacturer's factory, in a repair shop, or during testing operation.

Parameters and variables that have been received or calculated by control device 1, and are likewise included among the input variables, can also be stored in memory 12. Computation unit 10 executes a software program to determine one or more output variables for performing the open- or closed-loop control functions of control device 1. "Output variables" refers here to the variables necessary for open-/closed-loop control, which it is impossible or very complex to measure or determine directly in the vehicle and which are therefore determined from the available input variables. For this the control device carries out, during operation, a Bayesian regression over the training data that are stored in memory 12 and are relevant to the output variable to be determined, in consideration of the input variables relevant to the output to be determined. For this, calculation unit 10 can execute the algorithms necessary for carrying out the regression in software, but it can also offload computation steps to specialized hardware units such as logic circuit 14 that is shown in FIG. 1 and is connected to the computation unit. The output that is determined, or an open- or closed-loop control signal determined with it, is outputted via output 13, e.g. to actuator 104.

The methods presented here are very well suited for use in dynamic modeling with autoregressive approaches. This expands the potential applications into areas in which, for example in a context of dynamic load changes, the transient behavior of the modeled variable is important (see Detailed Description). [Multiple-step ahead prediction for non linear dynamic Systems—A Gaussian process treatment with propagation of the uncertainty, A. Girard, C. E. Rasmussen, and R. Murray-Smith, in Advances in Neural Information Processing Systems 15, Cambridge, 2003] [Comprising Prior Knowledge in Dynamic Gaussian Process Models, K. Azman and J. Kocijan, International Conference on Computer Systems and Technologies—CompSysTech 2005] [Gaussian process approach for modeling of nonlinear systems, G. Gregorcic, G. Lightbody, in Engineering Applications of Artificial Intelligence 22, pages 522-533, 2009] Dynamic modeling is a relative direct expansion of the proposed method. Whereas with classic quasi-steady-state modeling only the current input values at time t can be used as inputs, dynamic modeling permits on the one hand input values from the past, e.g. Xi(t−1), . . . Xi(t−m), in order to capture slow-acting input variables, and on the other hand the most recent output values, i.e. y(t−1), . . . y(t−m), in order to model sluggish systems with memory effects. It is thereby possible to achieve better mapping of, for example, variables with a memory effect such as exhaust gas temperature, which is also dependent on past engine variables, or variables such as boost pressure, which depends on the turbocharger setting (which changes only slowly).

Figure 2A:
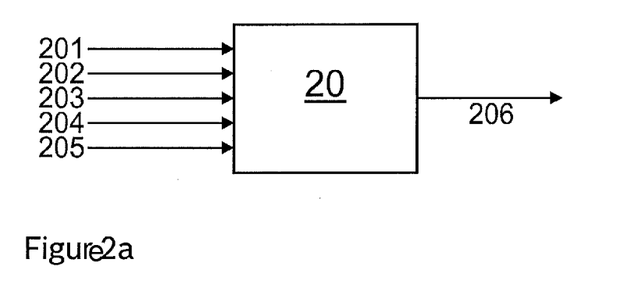
FIG. 2a schematically shows a non-dynamic modeling operation.
Figure 2B:
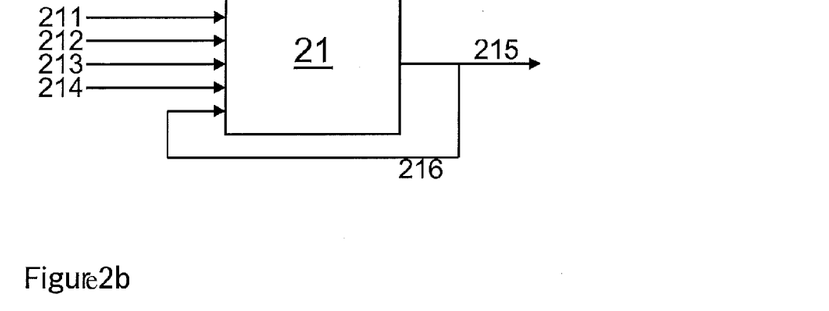
FIG. 2b schematically shows a dynamic modeling operation.

FIG. 2a shows a non-dynamic method in which current input variables 201 to 205 are incorporated into a Bayesian regression 20 in order to identify an output variable 206. FIG. 2b, on the other hand, shows a dynamic modeling operation, in which current input variables 211 and 212, input variables from the past 213 and 214, and the output variable from the past 216 are incorporated into Bayesian regression 21 in order to identify the current output variable 215.

As mentioned, Bayesian regression methods are notable for being so-called "black box" methods, i.e. these regression methods have, for model creation, no input parameters other than the training data measured offline. Without prior knowledge and with no parameterization of the modeling algorithm by an applications engineer, they can easily map high-dimensional nonlinear correlations based only on the measured training data. In contrast to all other methods, the Bayesian regression models can moreover, in addition to model prediction, also provide a conclusion as to model variance (model uncertainty) at the particular point being queried. This makes it possible to detect unforeseen system states and react to them accordingly. This case can occur, for example, if the system has not been completely excited when the measurement/training points are recorded; for example, an engine for the reference measurements was operated only at low engine speeds. The characteristics-diagram approach would, if applicable, proceed steadily with the prediction, and so might a physical approach if input correlations were reduced to characteristic curves or characteristics diagrams.

The additional model variance allows us to ascertain, on the control device, whether the model is suitable for making reliable predictions in the current system state, as in the above example in which only measurement/training points for low engine speeds were recorded in the training phase for an engine model, but the driver is driving in high engine-speed ranges. With the model variance of the Bayesian regression it is possible, for example, to ascertain that the model is not reliable in this case, and one could switch over from a conventional open-/closed-loop control approach to a defensive open-/closed-loop control approach for exceptional situations, so that the engine cannot be damaged as a result of incorrect model outputs (fail-safe mode). Further actions, such as fault signal output, are also conceivable.

Figure 3A:
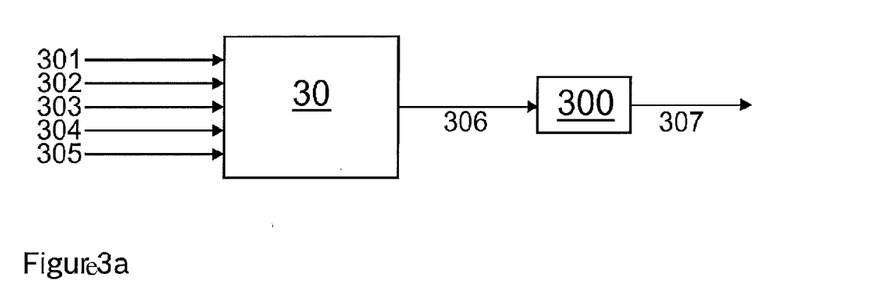
FIG. 3a schematically shows a closed-/open-loop control system using an output variable.
Figure 3B:
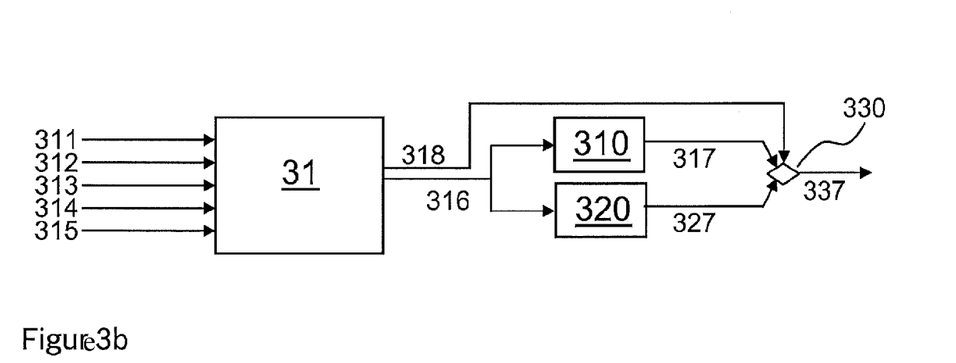
FIG. 3b schematically shows a closed-/open-loop control system using an output variable, and the variance thereof.

FIG. 3a schematically shows input variables 301 to 305 that are incorporated into a Bayesian regression 30 in order to identify output variable 306, from which an open-/closed-loop control signal 307 is determined by way of an open-/closed-loop control function 300. In FIG. 3b, corresponding input variables 311 to 315 are incorporated into a Bayesian regression 31. In addition to output variable 316, variance 318 of output variable 316 is taken into consideration as open-/closed-loop control proceeds. "Variance" is not to be understood here in the strictly mathematical sense, but instead refers to the uncertainty, estimated by the regression, associated with the determination of the output variable. For this, on the basis of output variable 316 a defensive open-/ closed-loop control function 310 and a conventional open-/closed-loop control function 320 are used, which respectively determine a defensive open-/closed-loop control signal 317 and a conventional open-/closed-loop control signal 327. Depending on variance 318, decision function 330 decides which of the two open-/closed-loop control signals 317 and 327 is to be outputted as open-/closed-loop control signal 337. With a high variance 318, in particular a variance 318 that exceeds a specific threshold, the defensive open-/closed-loop control signal 317 is selected, otherwise the conventional open-/closed-loop control signal 327.

The proposed Bayesian regression methods can be computed in the control device in real time, either in software or at least partly in special hardware. They are outstandingly parallelizable, so that efficient implementations are possible both on future standard multicore architectures and in dedicated hardware.

The relevant algorithm in C code for a software implementation could read, for example, as follows:

```
float amu_asc_predict_single(
    float *p1, /* m_x (Dim. D) */
    float *p2, /* f_x (Dim. D) */
    float *p3, /* Qya (Dim. N) */
    float p4, /* f_y (Dim. 1) */
    float p5, /* m_y (Dim. 1) */
    unsigned int p6 , /* N (Dim. 1): Number of training
        points/passes through external loop. */
    unsigned int p7, /* D (Dim. 1) */
    unsigned intp8, /* NStart (Dim. 1): Starting value of
        external loop. First index = 0 */
    float p9, /* vInit (Dim. 1): Normally 0, except upon
        continuation: then intermediate sum of
        preceding loop iterations.*/
    float *V, /* hatX (Dim N*D): Rescaled training points */
    float *u /* Test point tilde u (Dim. D) */
    )
{
    float v = p9;
    float C = 0.0;
    float t;
    unsigned int k,j,i;
    for (k=0; k < p7; k++)
    {
        u[k] = (u[k] - p1[k]) * p2[k];
        C += u[k] * u[k];
    }
    for (j=p8; j < p6;j++)
    {
        t = -C;
        i =j * p7;
        for (k=0; k < p7; k++)
        t += V[i+k] * u[k];
        v += p3[j] * exp(t);
    }
    return v*p4 + p5;
}
```

This reduced form is valid for kriging, Gaussian processes, and sparse Gaussian processes. As is evident from the C code, the evaluation of the model can be parallelized by distributing especially, but not exclusively, the loop through j (in the formula, the external sum over N) over multiple computation units (e.g. CPU1: sum p8 to t; CPU2: sum t+1 to p6), and then combining the sub-results again in a separate step (e.g. v1=CPU1, v2=CPU2; v=(v1+v2)−k*p5, where k=number of CPUs−1 (in the example, k=1)).

Alternatively to a calculation in software, as described by way of example with the above source code, the necessary algorithms can also be implemented entirely or partly in specialized hardware. For example, a hardware unit, in particular a logic circuit, that is associated with a computation unit of the control device can be optimized for the calculation of specific computation steps necessary for carrying out the Bayesian regression. It is particularly advantageous in this context to offload the execution of exponential function calculations to the logic circuit.

Figure 4:
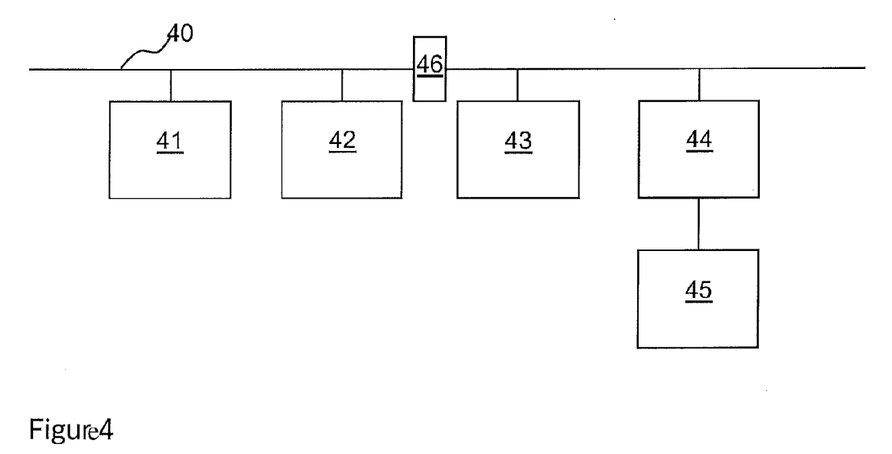
FIG. 4 schematically shows components of a microcontroller of a control device and its connections.

FIG. 4 schematically shows, for this purpose, components of a microcontroller of a control device and their connections. A computation unit or processor core 41 of a computation unit, a first global memory unit 42, a second global memory unit 43, and a logic circuit 44 are each connected to communication connection 40, and by way of the latter can each communicate with one another. Communication connection 40 can be provided, for example, as a bus system. FIG. 4 divides communication connection 40 into two separate buses, for example with a bus bridge 46. Logic circuit 44 can be connected to a local memory unit 45.

Global memory units 42 and 43 can be configured, for example, as RAM memories or flash memories. The provision of two global memories in FIG. 4 is an optional configuration. Local memory 45 can be provided, for example, as RAM memory or as a register, and is preferably visible in the global address region. Bus bridge 46 shown in FIG. 4 is optional. As discussed in more detail in the description below, in a particular embodiment of the invention it is also possible to omit local memory 45. The components of the microcontroller that are shown in FIG. 4 are not to be understood as exhaustive; in particular, further processor cores can also be provided.

Circuit arrangement 44 is configured to calculate an exponential function or (since it is configurable) various exponential functions, and optionally the sum of exponential functions. It represents a state machine that fetches input data from an input memory for calculation, calculates an exponential function in the course of the calculation, optionally calculates the sum of exponential functions in the necessary loop iterations, by way of an execution control system in communication with the computation unit or with processor core 41 of the microcontroller, and thus serves in a way as a hardware accelerator in the performance of complex tasks of the microcontroller or calculations of processor core 41. Logic circuit 44 is present here as a separate hardware component outside the processor.

Many approaches to the calculation of exponential functions in hardware circuits are known. For example, a BKM (Bajard/Kla/Muller) algorithm, a CORDIC algorithm, or known series developments for the approximation of exponential functions can be used.

The logic circuit of the microcontroller herewith proposed can assist calculations of the microcontroller by making available calculated exponential functions, and can thus make possible faster, more economical (in terms of cost and space requirement), more energy-efficient, and more reliable calculations of tasks of the microcontroller for which the calculation of exponential functions represents a sub-task. The capability of configuring the logic circuit can result in particularly flexible but still efficient calculation assistance.

Because the logic circuit is present as a separate hardware component outside the processor, there are no direct correlations with the processor. The result is to avoid mutual influences on the execution speed of the further processor functions. Execution of the software is not directly influenced. Despite the limited functionality, the functionality that is implemented can nevertheless be utilized as flexibly as possible, and for that purpose is controlled by a software processor.

The logic circuit in the microcontroller can be used particularly flexibly if it is configurable; for example, configuration data for purposes of configuring it can be read out of a configuration data memory. Such configuration data can be training data or hyperparameters, or can also refer to how the exponential function or the sums are to be calculated. It is also possible to stipulate that the logic circuit calculates exponential functions of sums of variable length and summands. The summation of different exponential functions can also be configured, such that for each of the exponential functions to be summed, the parameters and the number of exponential functions to be summed can be configurable. In addition, the configuration can also related to the manner in which the exponential function is calculated, for example if various calculation paths are possible using the logic circuit or if, for example, a parallelization of calculations within the logic circuit is possible.

The configuration data can usefully be generated by the processor or by a further computation unit of the microcontroller, preferably as a function of the task to be calculated or of specific vehicle data, and written into a configuration data memory to which the logic circuit has access. The logic circuit is thus flexibly adaptable to the tasks being calculated, but also to further conditions.

For efficient implementation of the configuration, the logic circuit can possess a connected (local) memory in which the configuration data are stored.

If savings are to be realized by not using a local memory, it can also be advantageous to store the configuration data in a global memory to which the logic circuit can have, for example, direct memory access (DMA) so as to enable rapid and reliable configuration with this solution as well.

Figure 5:
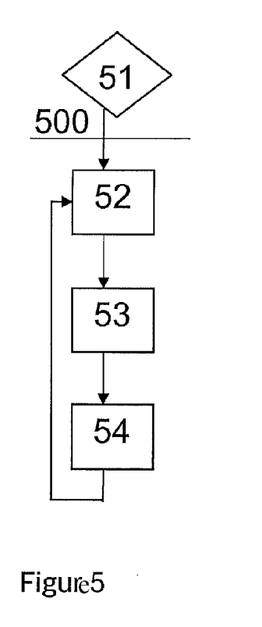
FIG. 5 shows a method for determining output variables on the basis of input variables and a training variable, using Bayesian regression.

FIG. 5 schematically shows the steps of a method for ascertaining output variables using a control device during driving operation, by Bayesian regression of training data determined prior to driving operation.

In the first step 51, training values for input variables and output variables are determined in an application phase by measurements before operation (also referred to as "offline"), i.e. for example at the control device manufacturer's or vehicle manufacturer's factory, and stored for access by the control device. The values thus determined are on the one hand values that can be transmitted by sensors to the control device during operation of the vehicle (online), or general values that can be determined by the control device, for example, indirectly by calculations based on sensor data.

These are the input values of the model in online mode. On the other hand they are values that cannot be determined directly for the control device during online operation of the control device or of the vehicle. Such values may, however, be needed by the control device in order to control specific functions of the vehicle. These are the output values of the model in online mode.

Separating line 500 separates, for the method illustrated, the offline method step 51 from the online method steps 52 to 54.

In the second method step 52, the control device receives input variables, e.g. from sensors.

In the third method step 53 the control device carries out, on the basis of the received and possibly further stored or computationally ascertained input values, a Bayesian regression based on the training values previously determined offline, and thereby identifies at least one output variable and optionally a variance of the output variable from which a conclusion can be drawn as to the accuracy of the output variable determination. Within the control device the Bayesian regression can be carried out, for example, by one or more computation units of the control device in software; sub-tasks of the calculation, however, in particular the calculation of exponential functions, can also be offloaded to a hardware unit, in particular a logic circuit, optimized therefor.

In the fourth method step 54, the control device uses the determined output variable, and optionally the variance thereof, to control in open- or closed-loop fashion a function in the vehicle, for example by outputting an open- or closed-loop control signal to an actuator.

During operation of the vehicle, the method is usually carried out repeatedly in succession, in particular including for different output variables and on the basis of different input variables. Different such methods can also be carried out in entirely or partly parallel fashion.

What is claimed is:

1. A control device in a vehicle, comprising:
a calculation unit configured to calculate, during operation of the vehicle and on the basis of at least one input variable ascertained during operation of the vehicle, at least one output variable for a control system of a function of the vehicle, wherein the calculation unit is configured to perform the calculation of the at least one output variable using a Bayesian regression over training values ascertained, before operation, for the at least one output variable and the at least one input variable;
a computation unit configured to carry out the Bayesian regression at least partly; and
a logic circuit that is associated with the computation unit of the control device, wherein the logic circuit is optimized for the calculation of specific computation steps of the Bayesian regression;
wherein the at least one input variable ascertained during the operation of the vehicle represents at least one of temperature signals, rotation speed signals, and quantity signals, the at least one of temperature signals, rotation speed signals, and quantity signals being received by the control device from at least one of: (i) at least one sensor of the vehicle, (ii) at least one other control device of the vehicle, and (iii) at least one module of the vehicle outside the control device;
wherein the at least one output variable includes at least one combustion engine-relevant parameter; and
wherein the control device controls a combustion engine of the vehicle using the at least one combustion engine-relevant parameter during operation of the vehicle.

2. The control device as recited in claim 1, wherein the calculation unit implements the Bayesian regression as a kriging or a sparse Gaussian process.

3. The control device as recited in claim 2, wherein the calculation unit determines a variance, ascertained from the Bayesian regression, of the output variable.

4. The control device as recited in claim 3, further comprising:
means for initiating a corrective action if the ascertained variance exceeds a predetermined threshold value.

5. The control device as recited in claim 3, wherein for the calculation of the at least one output variable, a Bayesian regression dynamically modeled by autoregression is carried out over the training values ascertained before operation.

6. The control device as recited in claim 1, wherein the logic circuit associated with the computation unit is configured to calculate exponential functions.

7. The control device as recited in claim 1, wherein the calculation unit implements the Bayesian regression as a Gaussian process.

8. The control device as recited in claim 7, wherein the calculation unit determines a variance, ascertained from the Bayesian regression, of the output variable.

9. The control device as recited in claim 8, further comprising:
means for initiating a corrective action if the ascertained variance exceeds a predetermined threshold value.

10. The control device as recited in claim 8, wherein the logic circuit associated with the computation element is configured to calculate exponential functions.

11. The control device as recited in claim 1, wherein the calculation unit implements the Bayesian regression as a kriging process.

12. The control device as recited in claim 1, wherein the calculation unit implements the Bayesian regression as a sparse Gaussian process.

13. The control device as recited in claim 1, wherein the calculation unit is further configured to:
determine a variance, ascertained from the Bayesian regression, for the at least one output variable;
wherein the control device is configured to control the vehicle according to a first control scheme, and when the ascertained variance exceeds a predetermined threshold value that indicates that a model used for the Bayesian regression is not reliable, switch from the first control scheme to a second fail-safe control scheme and control the vehicle according to the second fail-safe control scheme which prevents damage to the vehicle.

14. A method for calculating by a control device in a vehicle, during operation of the vehicle and on the basis of at least one input variable ascertained during operation, at least one output variable for a control system of a function of the vehicle, comprising:
ascertaining training values for the at least one output variable and the at least one input variable before operation of the vehicle;
during operation of the vehicle, receiving, by the control device, the at least one input variable ascertained during the operation of the vehicle including at least one of (i) temperature signals, (ii) rotation speed signals, and (iii) quantity signals, from at least one of: (i) at least one sensor, (ii) at least one other control device, and (iii) at least one module outside the control device, the at least one of the temperature signals, rotational signals, and quantity signals being ascertained during the operation of the vehicle;
during operation of the vehicle, performing the calculation of the at least one output variable using a Bayesian regression over the training values;
during operation of the vehicle, carrying out the Bayesian regression at least partly with a computation unit of the control device; and
optimizing a logic circuit that is associated with the computation unit of the control device for the calculation of specific computation steps of the Bayesian regression;
wherein the at least one output variable includes at least one combustion engine-relevant parameter; and
wherein the method further comprises controlling, by the control device, a combustion engine of the vehicle using the at least one combustion engine-relevant parameter during the operation of the vehicle.

15. The method as recited in claim 14, wherein a variance, ascertained from the Bayesian regression, of the output variable is also taken into consideration for the control system.

16. The method as recited in claim 15, wherein the Bayesian regression is implemented as a kriging or a sparse Gauss process and is dynamically modeled by autoregression carried out over the training values ascertained before operation.

17. The method as recited in claim 15, wherein the Bayesian regression is implemented as a kriging process.

18. The method as recited in claim 15, wherein the Bayesian regression is implemented as a sparse Gauss process.

19. The method as recited in claim 15, wherein the Bayesian regression is implemented as a Gauss process.

20. The method as recited in claim 14, further comprising:
determining a variance, ascertained from the Bayesian regression, for the at least one output variable;
controlling the vehicle according to a first control scheme; and
when the ascertained variance exceeds a predetermined threshold value that indicates that a model used for the Bayesian regression is not reliable, switching from the first control scheme to a second fail-safe control scheme and controlling the vehicle according to the second fail-safe control scheme which prevents damage to the vehicle.

* * * * *